No. 847,163. PATENTED MAR. 12, 1907.
T. COPE.
TROLLEY.
APPLICATION FILED NOV. 17, 1906.
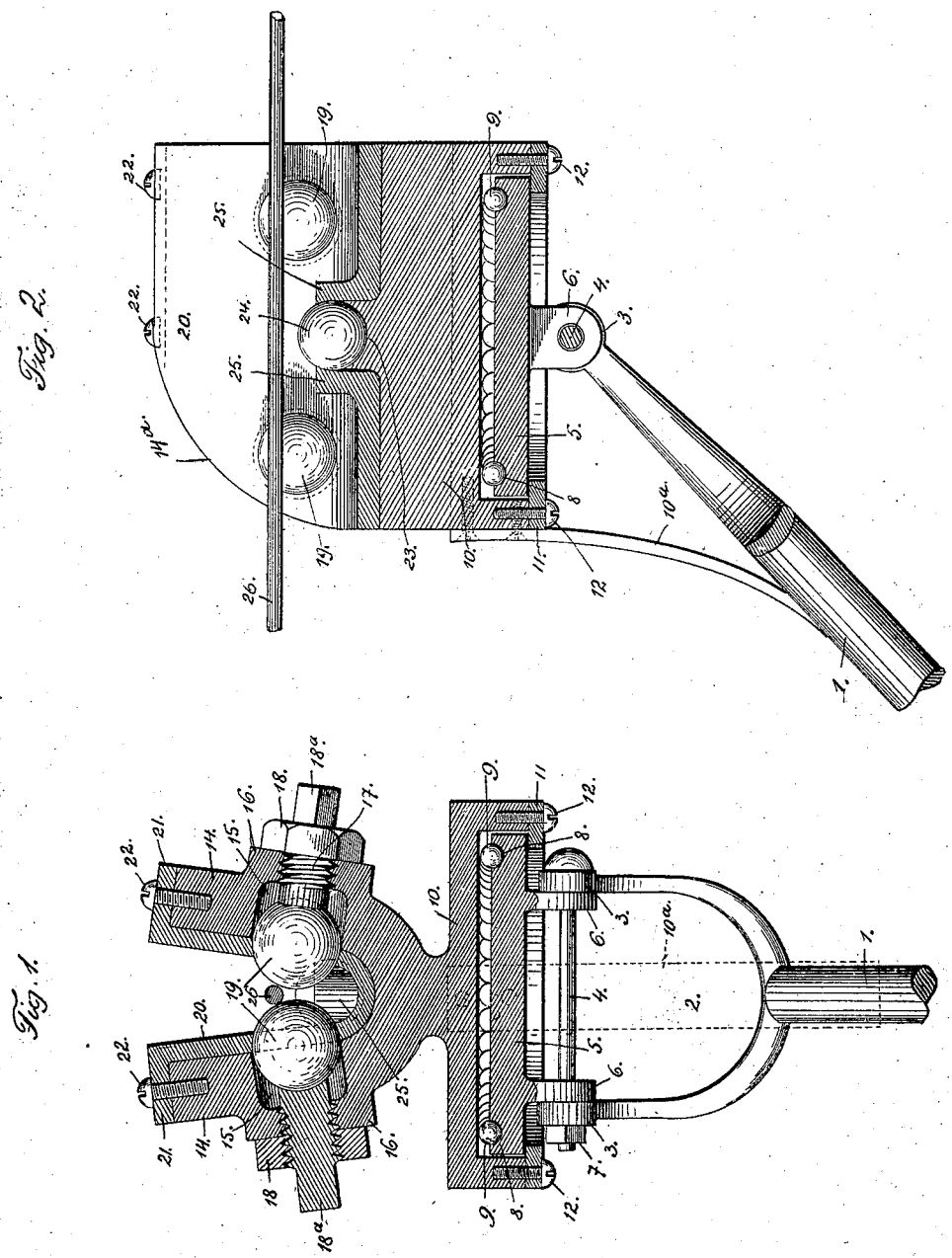
WITNESSES:
INVENTOR
Thomas Cope
BY
Attorneys

UNITED STATES PATENT OFFICE.

THOMAS COPE, OF McKEES ROCKS, PENNSYLVANIA.

TROLLEY.

No. 847,163.     Specification of Letters Patent.     Patented March 12, 1907.

Application filed November 17, 1906. Serial No. 343,842.

*To all whom it may concern:*

Be it known that I, THOMAS COPE, a citizen of the United States of America, residing at McKees Rocks, in the county of Allegheny and State of Pennsylvania, have invented certain new and useful Improvements in Trolleys, of which the following is a specification, reference being had therein to the accompanying drawing.

This invention relates to certain new and useful improvements in trolleys for motor-driven cars and vehicles; and the invention has for its primary object to dispense with the ordinary type of trolley wheel and harp heretofore used and provide novel means to insure a more positive operation of a car or vehicle in connection with which my improved trolley is used.

Another object of this invention is to provide a simple and inexpensive trolley wherein the wire-contacting surfaces of a trolley can be easily adjusted when they have become worn.

A further object of this invention is to provide a trolley which will accommodate itself to the curves and irregularities of a trolley-wire, thus preventing a trolley from leaving its wire when a car or vehicle passes around a curve with considerable rapidity.

With these and other objects in view, which will more readily appear as the invention is better understood, the same consists in the novel construction, combination, and arrangement of parts to be hereinafter more fully described and then specifically pointed out in the appended claims.

Referring to the drawing, forming part of this specification, like numerals of reference designate corresponding parts throughout the several views, in which—

Figure 1 is a cross-sectional view of my improved trolley, and Fig. 2 is a longitudinal sectional view of the same.

In the accompanying drawing I have illustrated a trolley-pole 1, having a bifurcated or forked end 2, formed with pierced lugs 3. Extending through said lugs is a bolt 4, supporting a circular plate 5 through the medium of depending lugs 6. The bolt 4 is retained within the lugs 3 by a nut 7. The top of the plate 5 is formed with an annular ball-race 8, containing antifriction-balls 9, and revolubly mounted upon said balls is a cap 10, said cap being retained upon said balls by a ring 11, secured to the lower edge of the cap 10 by screws 12, said ring engaging the under edges of the plate 5.

Formed centrally of the cap 10 are upwardly-extending V-shaped arms 14, said arms being disposed at an angle with relation to one another. The confronting faces of the arms are provided with recesses 15, while their outwardly-extending faces are formed with bosses 16, in which are adjustably mounted screws 17, having lock-nuts 18 and rectangular ends 18$^a$. The screws 17 extend into the recesses 15 and bear against spherical bodies or balls 19, mounted therein. The balls are retained within their recesses by a U-shaped plate 20, mounted between the arms 14, said plate being flanged, as at 21, and secured to the upper edges of the arms 14 by screws 22.

Between the arms 14 and the recesses 15 of said arms is formed a ball-seat 23, adapted to revolubly support a ball 24. The ball is retained within its seat by central curved flanges 25, carried by the U-shaped plate 20. To the cap 10 is suitably secured a depending curved arm 10$^a$, the arm at its lower end resting upon the pole 1. The arm 10$^a$ is employed as a deflector in case the trolley-pole should contact with a cross-wire or trolley-wire hanger. In order that the wire may pass upwardly over the arms 14, said arms are beveled, as at 14$^a$.

In operation a trolley-wire or electrical conduit 26 is adapted to travel upon the balls 19 and revolve said balls within their respective recesses. As the balls become worn the screws 17 are adjusted to move the balls in closer proximity to one another. Should any irregularity in the wire 26 permit of the same passing between the balls 19, it is adapted to strike and ride upon the ball 24 until it has assumed its normal position. The cap 10, which is revolubly supported upon the plate 5, permits of the arms 14 swinging and being maintained in parallel alinement with the trolley-wire or conduit passing between said arms.

My improved trolley is constructed of strong and durable material, and I do not care to confine myself to the number of balls used in connection with the same, as such changes in the size, proportion, and minor details of construction as are permissible by the appended claims may be resorted to without departing from the spirit and scope of the invention.

What I claim, and desire to secure by Letters Patent, is—

1. In a trolley, the combination with a pole, of a plate pivotally attached thereto, antifriction-balls mounted upon said plate, a cap mounted upon said balls, and adapted to revolve thereon, angularly-disposed arms carried by said cap and having recesses formed in their confronting faces, a U-shaped plate secured to the upper edges of said arms and partially closing said recesses, balls mounted in said recesses, screws extending into said recesses and contacting with said balls, a ball supported centrally of said U-shaped plate, and means to retain said cap in engagement with the bearing-plate, substantially as described.

2. The combination with a trolley-pole, of a plate pivotally attached thereto, a cap revolubly mounted upon said plate, upwardly-extending arms carried by said cap and having recesses formed therein, balls mounted in said recesses, a U-shaped plate retaining said balls within said recesses, screws extending into said recesses, and a ball supported centrally of said U-shaped plate between said arms.

3. The combination with a trolley-pole, of a plate pivotally attached thereto, a cap revolubly mounted upon said plate, arms carried by said cap, balls revolubly supported in said arms, adjustable screws mounted in said arms and engaging said balls, and means to retain said cap upon said plate.

4. The combination with a trolley-pole, of a revoluble cap pivotally supported by said pole, arms carried by said cap, balls mounted in the confronting faces of said arms, a single retaining-plate for securing the ball in each arm, a ball mounted between said arms centrally of the first-mentioned balls, and means to adjust the first-mentioned balls.

In testimony whereof I affix my signature in the presence of two witnesses.

THOMAS COPE.

Witnesses:
C. KLOSTERMANN,
MAX H. SROLOVITZ.